United States Patent Office 3,712,849
Patented Jan. 23, 1973

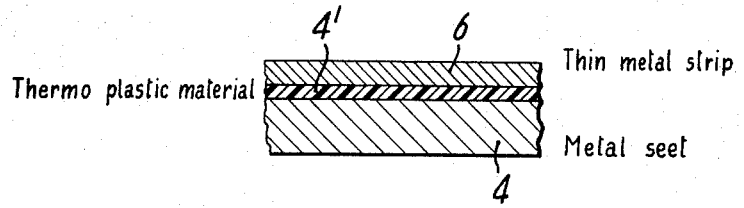
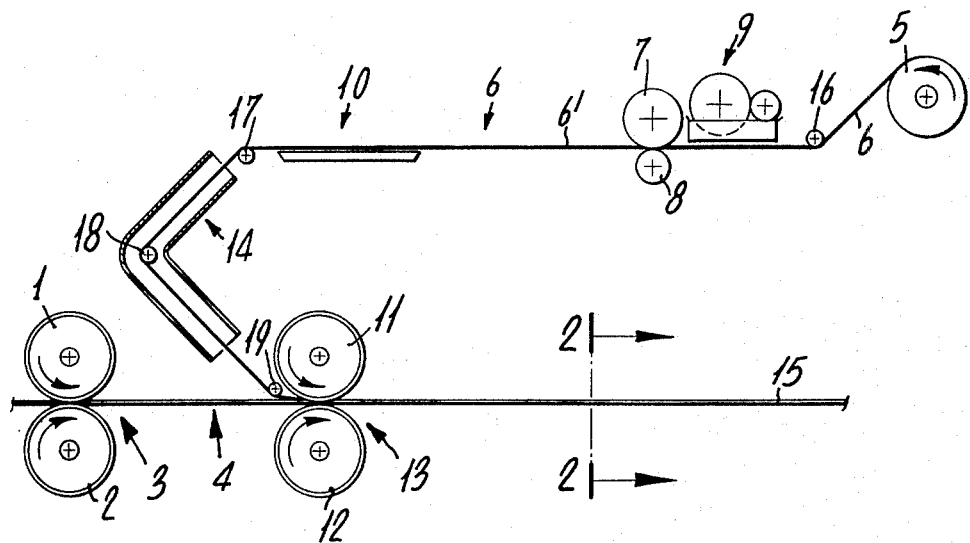

3,712,849
METALLIC LAMINATE
Dante Robbiati, Via Dante 6, Bernareggio, Italy
Application Dec. 12, 1968, Ser. No. 783,198, which is a continuation-in-part of abandoned application Ser. No. 446,186, Apr. 7, 1965. Divided and this application July 6, 1971, Ser. No. 160,051
Claims priority, application Italy, Dec. 14, 1964, 54,372/64
Int. Cl. B32b 15/08, 15/18, 15/20
U.S. Cl. 161—218                     1 Claim

ABSTRACT OF THE DISCLOSURE

A laminated composite sheet comprising at least two metal layers, such sheet being produced by coating a very thin foil of a valuable metal with an adhesive medium and joining it under pressure to the face of a thicker metal sheet which, prior to said joining, has been covered with a layer of thermoplastic material.

---

This application is a division of copending application Ser. No. 783,198, filed Dec. 12, 1968, now abandoned which is a continuation-in-part of application Ser. No. 446,186, filed Apr. 7, 1965, now abandoned.

It is an object of the present invention to provide a novel composite laminated sheet comprising two metal strips having interposed therebetween an intermediate thermoplastic layer.

More particularly, it is an object of this invention to provide a laminated sheet in which a very thin strip of a more valuable metal (such as stainless steel, nickel silver, copper, bronze, or brass) is coupled to a galvanized iron or aluminum back plate, a thermoplastic material layer being interposed between the two strips.

In order that the invention may be clearly understood and readily carried into effect, the same will now be described with reference to and by aid of the accompanying drawing in which:

FIG. 1 illustrates diagrammatically an apparatus for carrying out the method by which the composite sheet of the invention is produced; and FIG. 2 is a diagrammatic sectional view along line 2—2 of FIG. 1, illustrating in cross-section the composite laminated sheet of this invention.

The apparatus of FIG. 1 includes, in combination, two calenders indicated with reference numerals 3 and 13 respectively, a supply reel 5, a gluing device 9, two furnaces indicated with reference numerals 10 and 14 respectively, as well as several idle rollers indicated with references 16, 17, 18, and 19. The rotational directions of the various rollers are indicated by arrows in FIG. 1.

The above-mentioned apparatus and its operation will be more particularly illustrated in the following method description.

Referring to FIG. 1, a continuous metal sheet 4 is shown being advanced between rollers 1 and 2 of calender 3, said sheet 4 being, for example, a galvanized iron or aluminum plate, which has been plasticized according to known methods and having therefore a layer 4' of thermoplastic material containing, for example, plasticized polyvinyl (100/40) on its upper face.

A thin strip 6, such as a stainless steel or nickel silver or bronze or copper or brass strip, is unrolled from reel 5 onto which said strip is wound, and is passed beneath roller 16 and then between rollers 7 and 8 of a known type which form part of the device 9, which deposits an adhesive layer of a uniform thickness on the upper face 6' thereof. Illustrative material for a suitable adhesive layer is polyvinyl chloride-acetate copolymer dissolved in a suitable solvent, such as ketone and more precisely methylethylketone.

Strip 6 is then passed through a preferably electric furnace 10. This furnace heats the strip 6 to a temperature of 70–90° C. in order to allow evaporation of the solvent contained in the adhesive, and, by means of idle rollers 17 and 18, is subsequently passed through a preferably gas-heated furnace 14 wherein the strip is subjected to a further heat treatment in a temperature range of 140–170° C. in order to regenerate dried adhesive residual.

On exiting from said furnace 14, strip 6 passes beneath idle roller 19, where it meets with strip 4 and more particularly with the face of the latter, which is covered with a thermoplastic material layer 4', as stated above.

The two strips 6 and 4, with the interposed thermoplastic material layer 4', are coupled by a calender 13, between the rollers 11 and 12 of which they pass.

Thus, by means of the above-described apparatus and method, provision is made for a composite laminated sheet being formed of: a lower strip formed of a galvanized iron or aluminum laminated sheet, an intermediate thermoplastic material layer and, finally, an upper strip formed of very thin laminated layer consisting of stainless steel or nickel silver or bronze or copper or brass or another valuable metal.

According to a modification of the described method, in lieu of using a strip having only one covered face, a strip having both faces covered with thermoplastic material can be used.

In addition, to the above-described installation, other installations can be formulated in order to improve the apparatus and method for producing the composite sheet according to the invention, without departing from the protective field of the present invention.

What is claimed is:
1. A composite laminated sheet, comprising a relatively thin sheet of a relatively valuable metal selected from the group consisting of stainless steel, bronze, brass, copper and nickel silver, at least one side of which is coated with an adhesive medium containing polyvinyl chloride-acetate copolymer dissolved in a suitable solvent; and a relatively thick sheet of a relatively cheaper sheet of metal selected from the group of galvanized iron and aluminum, at least one side of which has joined thereto a thermoplastic layer of plasticized polyvinyl; said coated side of said relatively very thin sheet of a relatively valuable metal and said side of a relatively thick sheet of metal which has joined thereto said layer of thermoplastic material being joined to each other under pressure.

References Cited

UNITED STATES PATENTS 2,341,398   2/1944   Strother et al. _____ 161—218
2,956,915   10/1960  Korn et al. _____ 161—218 X

FOREIGN PATENTS 699,471   12/1964   Canada _____ 161—218

WILLIAM A. POWELL, Primary Examiner

U.S. Cl. X.R.

156—278, 310, 324, 333; 161—254, 256